United States Patent [19]

Hopkins

[11] 4,188,941

[45] Feb. 19, 1980

[54] SOLAR HEATING SYSTEM

[76] Inventor: James R. Hopkins, 9702 Dublin Dr., Manassas, Va. 22110

[21] Appl. No.: 908,838

[22] Filed: Jul. 14, 1978

[51] Int. Cl.² .............................................. F24J 3/02
[52] U.S. Cl. ..................................... 126/440; 126/449
[58] Field of Search ....................... 126/270, 271, 400; 237/1 A

[56] References Cited

U.S. PATENT DOCUMENTS

| | | | |
|---|---|---|---|
| 2,888,007 | 5/1959 | Tabor | 126/270 |
| 3,390,672 | 7/1968 | Snelling | 126/271 |
| 3,982,527 | 9/1976 | Cheng et al. | 126/270 |
| 4,137,899 | 2/1979 | Weslow | 126/270 |
| 4,151,829 | 5/1979 | Wilson | 126/271 |

FOREIGN PATENT DOCUMENTS 146820   5/1921   United Kingdom ..................... 126/271

*Primary Examiner*—James C. Yeung
*Attorney, Agent, or Firm*—John H. Merchant

[57] ABSTRACT

A solar heating system including a unit for converting the sun's rays into heat, comprising an insulated tank lined with a heat reflecting metal and containing a fluid heat transfer medium, a cover of insulating material enclosing the top of the tank, having a series of apertures therein, which may be of conical shape, heat absorbing metal positioned below the apertures and immersed in the fluid heat transfer medium, a framework located above the apertured tank cover supporting a lens system comprising a plurality of lenses located directly over the apertures and focused on the heat absorbing metal immersed in the heat transfer medium, means for maintaining the lens system in focus with the heat absorbing metal during daylight hours, and means for circulating the fluid heat transfer medium through the solar heating unit and through a heat exchanger.

6 Claims, 4 Drawing Figures

SOLAR HEATING SYSTEM

BACKGROUND OF THE INVENTION

The use of solar energy to supplement and replace, in part, reliance on conventional energy sources such as oil, coal, and other fossil fuels, has become a matter of national concern and the subject of increasing technological research. As our source of fossil fuels is gradually depleted and we are forced to rely on increased imports of foreign oil, resulting in increasing trade deficits, the necessity for developing new sources of energy becomes apparent. While nuclear reactors may be a partial solution to our problem, at the present state of development, this source of energy has proved extremely costly and the disposal of waste products poses a problem.

Development of efficient solar heating devices and systems, particularly in those sections of the country blessed with an abundance of sunshine, seems to be a logical approach in an effort to alleviate our energy crisis. Solar energy offers many advantages in that the supply seems endless and it provides a clean source of heat without resulting in any objectional end products.

Various types of solar heating systems have been proposed, including for example, heating units which constitute a structural part of the roof of a building, as shown in the U.S. Patent to Moore, No. 4,010,733, and the U.S. Patent to Warren, No. 4,029,080. Units of this type, being an integral part of the building, are necessarily restricted to use in a single location and cannot be readily moved without material alteration or reconstruction of the building.

In smaller units, in order to make more effective use of sunlight, a system of lenses has been used to concentrate or focus the sunlight on a heat collecting surface, such as metal, submerged in a heat transfer fluid, which is circulated through the heating unit and through a heat exchanger. The solar heating unit may be mounted for tracking with the sun so as to maintain the lens system in focus with the sun's rays during daylight hours. Devices of this type are disclosed, for example, in the U.S. Patents to Manly, No. 2,902,028; Rogers, No. 3,929,121, and Minnich, No. 3,981,295.

The present invention relates to a solar heating system incorporating a heating unit or panel of the latter type in which an improved heating unit has been devised to effect a more efficient conversion of solar energy to heat in which a fluid heat transfer medium, such as water, to which an anti-freeze agent may be added, is circulated through the heating unit and a heat exchanger.

I have discovered that more effective use of the sun's rays is obtained by using an insulated cover for the tank of the heating unit, the cover having a series or plurality of apertures, preferably of conical shape, each located below one of the lenses, the sun's rays being focused by the lenses onto a heat absorbing metal surface located directly below each aperture and in contact with or submerged in the fluid heat transfer medium, as more fully described in the following specification and accompanying drawings.

SUMMARY OF THE INVENTION

The herein described solar heating system includes a heat exchange unit and comprises, in general, an insulated tank lined with a heat reflecting metal and containing a fluid heat transfer medium, a cover of insulating material enclosing the top of the tank, a plurality of apertures, preferably of conical shape, in the cover, heat absorbing metal positioned directly below each aperture and immersed in the heat transfer medium, and means for supporting the heat absorbing metal above the bottom of the tank. A framework is mounted above the apertured cover for supporting a plurality of magnifying lenses directly over the apertures in the tank cover, the lenses being focused on the heat absorbing metal immersed in the fluid heat transfer medium. The entire heating unit, including the lens system, is mounted for oscillating or partial rotative movement to track with the sun and maintain the lens system in focus with the rays of the sun during daylight hours.

DESCRIPTION OF THE PREFERRED EMBODIMENT

Figure 1:
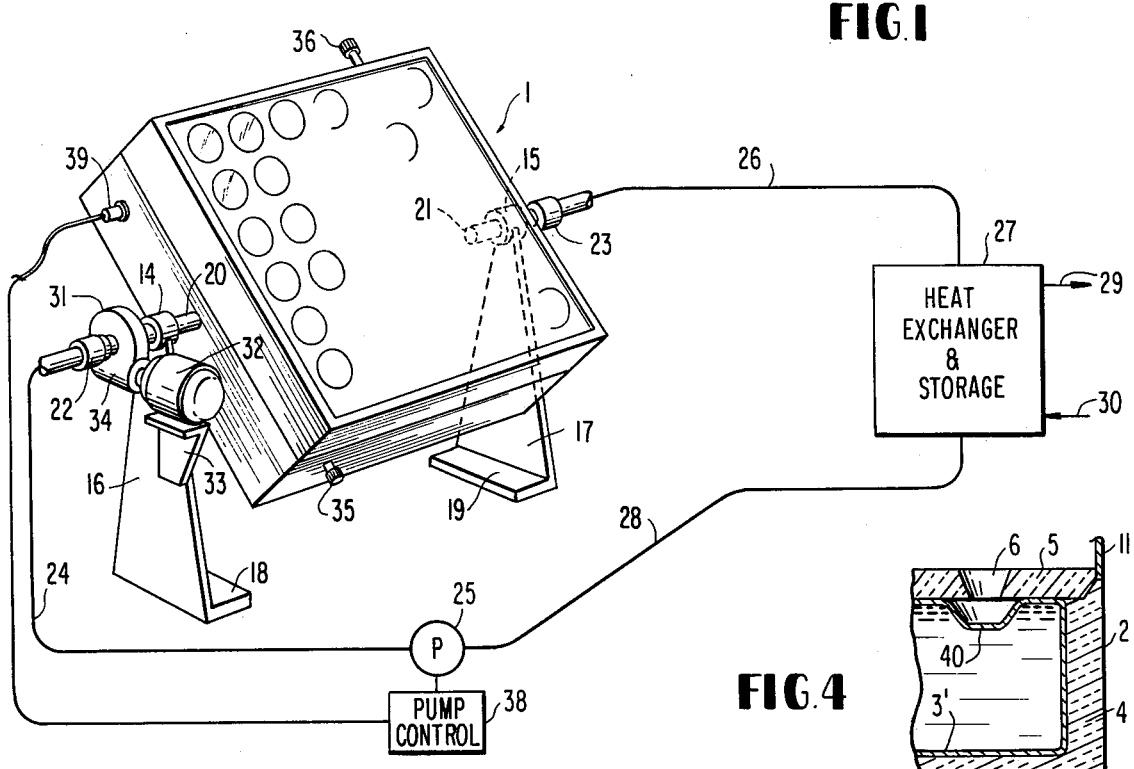
FIG. 1 is a perspective view of the solar heating unit mounted for partial rotation, with the associated devices, namely, the heat exchanger, circulating pump and controls, and the piping system, being diagrammatically shown.

The herein described solar heating system includes a solar heating unit or panel, designated generally at 1, and comprises a tank section 2, adapted to contain a fluid heat transfer medium, the tank being lined with a heat reflective material, such as metal, 3, and completely encased with a thermal insulating material 4. A removable top 5, also formed of insulating material and having its inner surface covered with a heat reflective material, such as metal, fits snugly with the side and end walls of the tank section 2, to provide a fluid tight seal. The bevel joint 5', assures proper positioning of the cover in relation to the bottom section of the tank 2, and align the lens system with apertures in the tank cover, as here-in-after described.

The insulated tank cover 5, is provided with a plurality or series of apertures 6, preferably of conical shape, which extend through the heat reflective lining 3, the openings in the lining being sealed with a transparent material, such as a glass plate 7, the latter being fused or bonded to the lining 3, to form a fluid tight seal.

Figure 2:
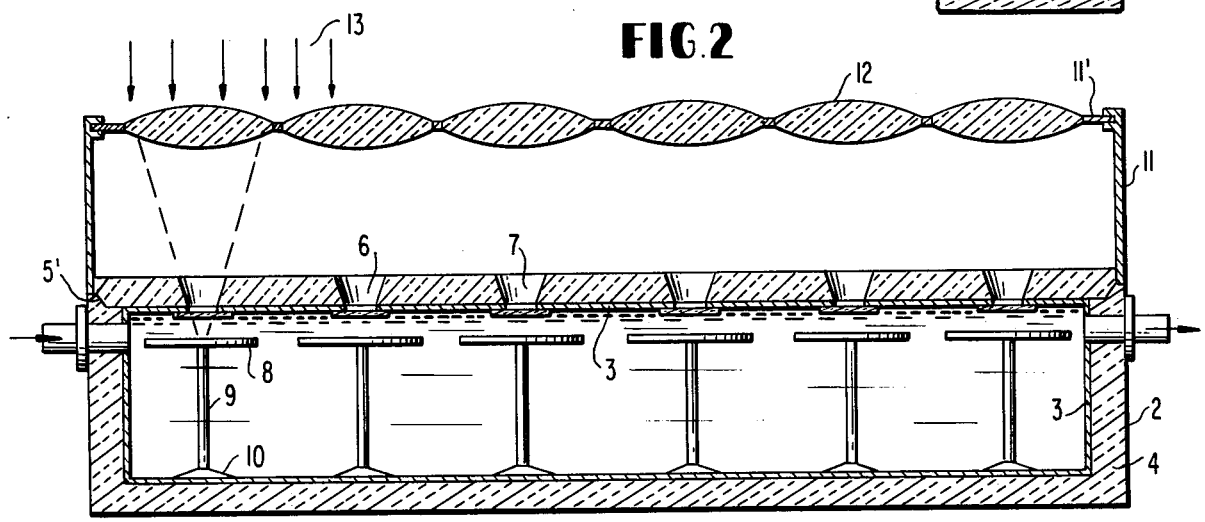
FIG. 2 is a longitudinal section taken along the center of the solar heating unit.
Figure 3:
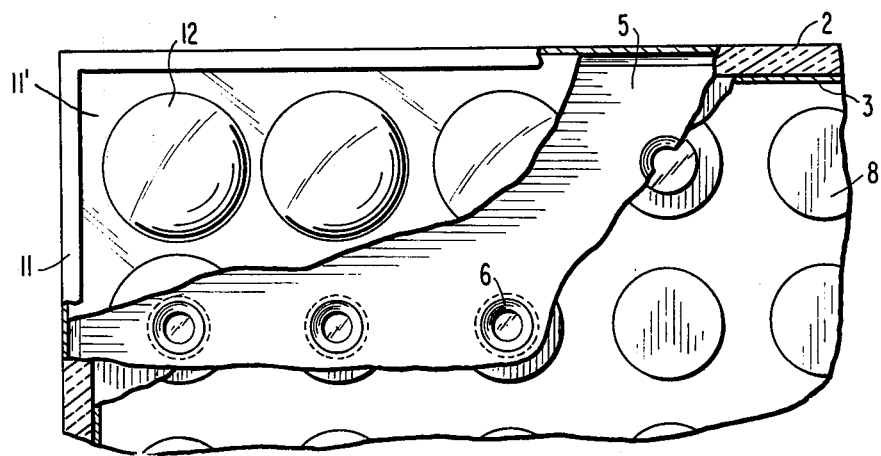
FIG. 3 is a fragmentary top view of the solar heating unit, with parts broken away.

Located directly under and a short distance below each aperture 6, as shown in FIG. 2, is a plate 8, of heat absorbing metal in the form of a disk or other suitable shape, mounted on a support 9, attached to the heat reflective lining 3, at the bottom of the tank, as at 10. However, if desired, the metal plate 8, may be supported from the insulated tank cover 5, the supports being relatively small in cross-section so as not to materially impede the flow of heat transfer fluid through the tank.

Mounted directly above and supported by the apertured cover 3, is a framework 11, having a flat or horizontal section 11', providing support for a system of lenses 12, each lens being located directly above an aperture 6, in the insulated cover 5, and at a distance at which the sun's rays, designated generally at 13, will be focused through the apertures 6, and directly onto the metal plates or disks 8.

As shown in FIG. 1, the solar heating unit or panel is mounted on bearings 14, and 15, so that it can be partly rotated or oscillated to track with the sun. The latter bearings are supported by frame members 16, and 17, each frame member having a flange 18, and 19, respectively, to provide for a more stable or permanent mounting, if desired.

An inlet pipe 20, and an outlet pipe 21, which as previously noted, provide partly rotative support for the solar heating unit, said pipes being substantially at the same or slightly lower lever than the heat absorbing metal disks 8. These pipes are attached to the lower section 2, of the tank, and are mounted in bearings 14, and 15, to support the solar heating unit or panel so that the latter may be partly rotated.

A fluid-tight rotative coupling 22, connects the inlet pipe 24, leading to a circulating pump 25, while a like coupling 23, connects the outlet pipe 21, with the heat exchanger 27, through pipe 26. Pipe 28, connects the pump 25, with the heat exchanger to provide circulation of the heat exchange fluid from the heat exchanger 27, through the pump 25, the solar heating unit, and back to the heat exchanger 27. The heat exchanger, which is encased in insulation to minimize heat loss, is provided with an outlet 29, and an inlet 30, for circulating a heat transfer fluid to the desired point of use.

A tracking unit, designated generally by the numeral 31, includes a motor 32, mounted on a bracket 33, attached to the frame member 16, reducing and reversing gearing to oscillate the solar heating unit, serves to maintain the lens system in focus with the sun's rays and the unit operating at maximum efficiency during daylight hours. Appropriate and conventional electrical controls, not shown, may be used for this purpose.

In place of the inlet pipe 20, and the outlet pipe 21, of the solar heating unit, these openings may be capped and alternate inlet 35, and alternate outlet 36, may be connected by means of flexible pipes, not shown, to provide circulation of the heat transfer fluid through the solar heating unit and the heat exchanger. If this modification is used, solid rods may be substituted for the pipes 20, and 21, shown in the drawings, to support the solar heating unit.

A heat sensing device 39, is electrically connected by cable 37, with motor control means 38, to actuate a motor for the pump 25, when the heat transfer fluid reaches the desired temperature and to cut off the motor actuating the pump when the temperature falls below a specified level.

The heat sensing device 39, may be located at other points in the solar heating unit than illustrated in the drawing, and it may, for example, be mounted adjacent to or under the lower surface of one of the metal plates or disks 8, or adjacent an inlet pipe 20, or 35.

Figure 4:
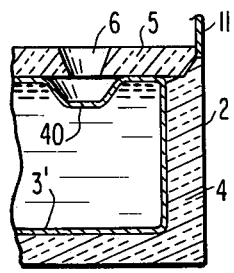
FIG. 4 is a sectional view taken along the center of the solar heating unit at one end thereof showing a modification in which the metal lining of the tank serves as the heat absorbing metal and is provided with indentations located directly below the apertures in the insulating cover.

In the modification illustrated in FIG. 4, a metal lining 3', for the apertured cover 5, of the tank section 2, serves as the heat absorbing metal and is provided below each aperture with an indentation 40, the lower surface of which is in direct contact with the fluid heat exchange medium contained in the tank 2. This configuration effects a rapid transfer of heat to the fluid heat exchange medium. In this modification of metal lining 3', covers the apertures in the insulating cover 5, and no additional seal is needed.

My invention has been described with reference to the preferred embodiment thereof, but it will be understood that other variations and changes, obvious to those skilled in the art made be made within the spirit of the appended claims. For example, the number of and arrangement of lenses employed may be varied depending upon the amount of energy desired to be transferred to the heat exchanger.

What is claimed is:

1. A solar heating system for converting the rays of the sun into heat, comprising,
    a sealed solar heating unit having a tank lined with a heat reflective metal and containing a fluid heat transfer medium completely filling the tank, insulating material encasing the tank,
    a removable cover of insulating material having a heat reflective metal lining, said cover enclosing the top of said tank,
    a series of conical shaped apertures in said cover extending through the insulated cover and the metal lining thereof, the bottoms of the apertures being closed with transparent plates sealed to the inner surface of the heat reflective metal lining of the cover, flat heat absorbing metal units positioned directly below said apertures and immersed in the fluid heat transfer medium,
    means for supporting the flat heat absorbing metal units below the apertures in said cover,
    a framework located above the apertured cover of said tank, and
    a series of magnifying lenses located directly over the apertures in the tank cover focused on the upper surface of the flat heat absorbing metal units immersed in the fluid heat transfer medium.

2. A solar heat unit as defined in claim 1, in which the heat absorbing metal is in the form of disks supported above the bottom of the tank, the tank having an inlet and an outlet connected with a heat exchanger, and means for circulating the fluid heat exchange medium through the tank and the heat exchanger.

3. A solar heat unit as defined in claim 1, in which the tank is pivotally mounted for oscillating movement, means for oscillating the tank and the lens system to maintain the lenses focused on the heat absorbing metal during periods of operation.

4. A solar heat unit as defined in claim 1, in which the tank is provided with inlet and outlet pipes positioned at the approximate level of the flat heat absorbing metal units, for circulation of the fluid heat transfer medium therethrough, said pipes pivotally supporting the unit for oscillating movement, a circulating pump, and a heat exchanger, the inlet and outlet pipes being connected to the circulating pump and the heat exchanger through fluid-tight couplings.

5. A solar heating unit as defined in claim 1, the metal lining for the cover having indentations below and aligned with each aperture in the cover.

6. A solar heating unit as defined in claim 1, in which the heat exchange medium is a liquid.

* * * * *